(12) United States Patent
Sano et al.

(10) Patent No.: US 7,021,417 B2
(45) Date of Patent: Apr. 4, 2006

(54) VEHICLE STEERING APPARATUS

(75) Inventors: Osamu Sano, Kashihara (JP); Takehiro Saruwatari, Kashiwara (JP); Atsuya Miyata, Minamikawachi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/391,379

(22) Filed: Mar. 18, 2003

(65) Prior Publication Data

US 2003/0183442 A1 Oct. 2, 2003

(30) Foreign Application Priority Data

Mar. 29, 2002 (JP) .............................. 2002-095272

(51) Int. Cl.
*B62D 5/04* (2006.01)

(52) U.S. Cl. ...................... 180/444; 180/428

(58) Field of Classification Search ................ 180/428, 180/400, 444, 446; 74/388 PS, 127
See application file for complete search history.

(56) References Cited

U.S. PATENT DOCUMENTS

| | | | |
|---|---|---|---|
| 2,779,206 A * | 1/1957 | Doerfner ................ | 74/89.42 |
| 4,593,780 A * | 6/1986 | Saito ...................... | 180/444 |
| 4,735,271 A * | 4/1988 | Shimizu ................. | 180/444 |
| 4,754,829 A * | 7/1988 | Shimizu ................. | 180/446 |
| 5,685,390 A * | 11/1997 | Chikuma et al. ........ | 180/444 |
| 5,927,429 A | 7/1999 | Sugino et al. | |
| 6,041,885 A | 3/2000 | Watanabe et al. | |
| 6,164,407 A | 12/2000 | Cheng | |
| 6,173,802 B1 | 1/2001 | Kodaira et al. | |
| 6,244,125 B1 * | 6/2001 | Sano ...................... | 74/388 PS |
| 6,516,680 B1 * | 2/2003 | Nakamura et al. ....... | 74/388 PS |
| 6,629,578 B1 * | 10/2003 | Saruwatari et al. ...... | 180/444 |
| 6,691,819 B1 * | 2/2004 | Menjak et al. ........... | 180/446 |
| 6,810,985 B1 * | 11/2004 | Budaker et al. ......... | 180/444 |

FOREIGN PATENT DOCUMENTS

| | | |
|---|---|---|
| DE | 3712154 | 10/1987 |
| EP | 0 133 003 | 2/1985 |
| FR | 2 605 280 | 4/1988 |
| GB | 2146300 | 4/1985 |
| JP | 62-241766 | 10/1987 |
| JP | 2000-309279 | 11/2000 |
| JP | 2000-352450 | 12/2000 |
| JP | 2003301917 A * | 10/2003 |
| WO | WO- 02/08047 | 1/2002 |

* cited by examiner

*Primary Examiner*—Lesley D. Morris
*Assistant Examiner*—Daniel Yeagley

(57) ABSTRACT

In a vehicle steering apparatus, a rotating cylinder supported by a rack housing is threadingly engaged via rolling elements with a screw shaft integrated with a rack which meshes with a pinion which rotates by steering operation. The rotating cylinder is driven by a motor. All of the rolling elements are arranged between a rack support member which supports the rack in the position where the rack is meshed with the pinion, and a support body that is arranged in the movement range of the screw shaft and is capable of supporting the outer circumference of the screw shaft. Loads acting on the rack from the road surface are received by the support body and the rack support member.

7 Claims, 7 Drawing Sheets

VEHICLE STEERING APPARATUS

FIELD OF THE INVENTION

The present invention relates to a steering apparatus which generates a force causing a rack to move by a motor rotatably driving a rotating cylinder threadingly engaged with a screw shaft integrated with the rack, and changes steering angle by transmitting the movement of the rack to vehicle wheels.

DESCRIPTION OF THE RELATED ART

The conventional electric power steering apparatus 100 shown in FIG. 7 comprises a screw shaft 102 integrated with a rack 101 which engages with a pinion (not shown) which rotates by steering operation, a ball nut 104 threadingly engaged with the screw shaft 102 via balls 103, a driven bevel gear 105 integrated with the ball nut 104 so as to rotate together, a motor 107 for generating a steering assist force to drive a driving bevel gear 106 engaged with the driven bevel gear 105, and a rack housing 108 rotatably supporting the ball nut 104 and the driven bevel gear 105. By transmitting the movement of the rack 101 to vehicle wheels the steering angle changes.

In the electric power steering apparatus 100 as mentioned above, loads acting on the vehicle wheels from the road surface generate flexure and vibration in the rack 101. In order to absorb such vibrations, it has been proposed to support the rack 101 with a bearing composed of a material with strong vibration-dampening properties, in a position (on the right of the balls 103 in FIG. 7) between the above-mentioned balls 103 and a rack support member (not shown) which supports the rack 101 in the position where the rack 101 is meshed with the pinion (U.S. Pat. No. 6,041,885).

However, even if vibration could be dampened with a bearing composed of a material with strong vibration-dampening qualities, it was not possible to adequately reduce flexure of the rack 101. An increased flexure of the rack 101 is an increased flexure of the screw shaft 102, so that friction between the balls 103 and the ball nut 104 and between the balls 103 and the screw shaft 102 grows, and in some cases the transmitting efficiency of the power output of the motor 107 to the rack 101 declines by over 10%, efficient use of energy cannot be achieved, and the feeling of the steering declines.

Furthermore, arranging the screw shaft 102 in the vicinity of the end of the rack 101 has been desired because of necessities in the layout of preventing interference between the motor 107 and other components within the vehicle body. However, if the screw shaft 102 is arranged at the vicinity of the end of the rack 101, flexure of the rack 101 grows because the distance between the screw shaft 102 and the rack support member increases. In a rack-and-pinion steering apparatus employing a rack in which the screw shaft 102 is not provided in the above-mentioned way, flexure of the rack is prevented by supporting the vicinity of the end of the rack with a bush. However, in a case where the screw shaft 102 is provided at the vicinity of the end of the rack 101 being supported by a bush, the bush comes into contact with the opening edges of a spiral race 102a on the screw shaft 102 and becomes easily worn. As a result, transmitting efficiency deteriorates with play in the screw shaft.

An object of the present invention is to provide a vehicle steering apparatus which enables the above-mentioned problems to be solved.

SUMMARY OF THE INVENTION

The present invention provides a vehicle steering apparatus which comprises a pinion which rotates by steering operation, a rack which engages with the pinion, a screw shaft integrated with the rack, a rotating cylinder threadingly engaged with the screw shaft via rolling elements, a motor for driving the rotating cylinder, a rack housing rotatably supporting the rotating cylinder, and a rack support member which supports the rack in the position where the rack is meshed with the pinion, and which changes the steering angle by transmitting the movement of the rack to the vehicle wheels, wherein the vehicle steering apparatus further comprises a support body which is capable of supporting the outer circumference of the screw shaft and is arranged in the movement range of the above-mentioned screw shaft, all of the above-mentioned rolling elements are arranged between the support body and the above-mentioned rack support member, and loads acting on the above-mentioned rack from the road surface are received by the support body and the above-mentioned rack support member.

According to the present invention, loads acting on the rack from the road surface via the vehicle wheels are received by the rack support member and the support body which supports the rack, so that flexure of the rack between the support body and the rack support member can be prevented. All of the rolling elements are arranged between the support body and the rack support member, so that flexure in the screw shaft can be reduced, and increases in friction between the rolling elements and the screw shaft and between the rolling elements and the rotating cylinder can be prevented. Furthermore, the support body is arranged in the movement range of the screw shaft and is capable of supporting the outer circumference of the screw shaft, so that the screw shaft can be arranged in the vicinity of the end of the rack, further away from the rack support member than all of the rolling elements. As a result, the degree of freedom in the layout of the motor in the steering apparatus can be enhanced. A bush or bearing can be employed as the support body.

The above-mentioned support body can be supported by the above-mentioned rack housing. In this manner, even if the distance of the screw shaft from the rack support member increases, the outer circumference of the screw shaft can be supported by the support body and flexure of the screw shaft can be reduced.

Alternatively, the above-mentioned support body can be supported by the above-mentioned rotating cylinder. As a result, uneven wearing of the support body is prevented because the support body rotates relatively to the screw shaft, and moreover uneven wear through contact with the opening edges of the spiral race on the screw shaft is also inhibited, enhancing longevity. In this case, it is preferable to use a rolling bearing as the support body. By using a rolling bearing, the screw shaft and the rotating cylinder are able to smoothly rotate relatively, and the transmitting efficiency can be improved.

It is preferable that opening edges of the spiral race on the outer circumference of the above-mentioned screw shaft are chamfered. In this manner, wear of the support body caused by the contact with the opening edges of the race can be inhibited, and deterioration in transmitting efficiency resulting from play in the screw shaft can be prevented. The chamfered edge can be a convex curve or a level surface.

It is preferable that the dimension in the screw shaft axial direction of the spiral race on the outer circumference of the above-mentioned screw shaft is made smaller than the dimension in the screw shaft axial direction of the interval between sections of the spiral race. As a result, pressure acting on the inner circumferential surface of the support body from the outer circumferential surface of the screw shaft can be reduced, wear of the support body can be inhibited, and deterioration in transmitting efficiency resulting from play in the screw shaft can be prevented.

According to the present invention, in a steering apparatus which gives an axial force to a rack by a motor rotatably driving a rotating cylinder threadingly engaged with a screw shaft integrated with the rack, and changes steering angle by transmitting the movement of the rack to vehicle wheels, deterioration in the transmitting efficiency of the motor power output to the rack can be prevented.

DESCRIPTION OF THE PREFERRED EMBODIMENTS

An embodiment of the present invention is described below with reference to the figures.

Figure 1:
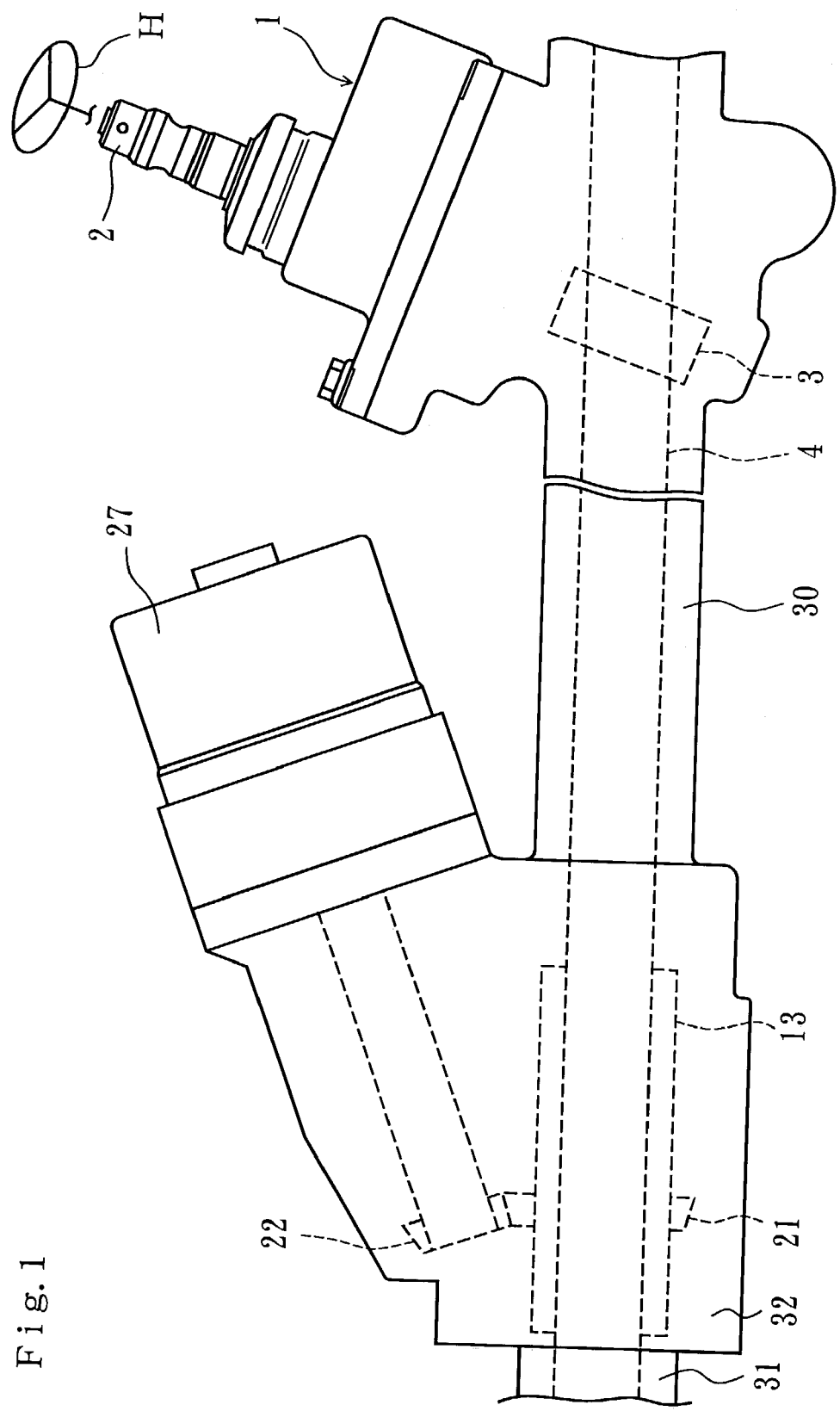
FIG. 1 is a frontal view of an electric power steering apparatus of an embodiment of the present invention.
Figure 2:
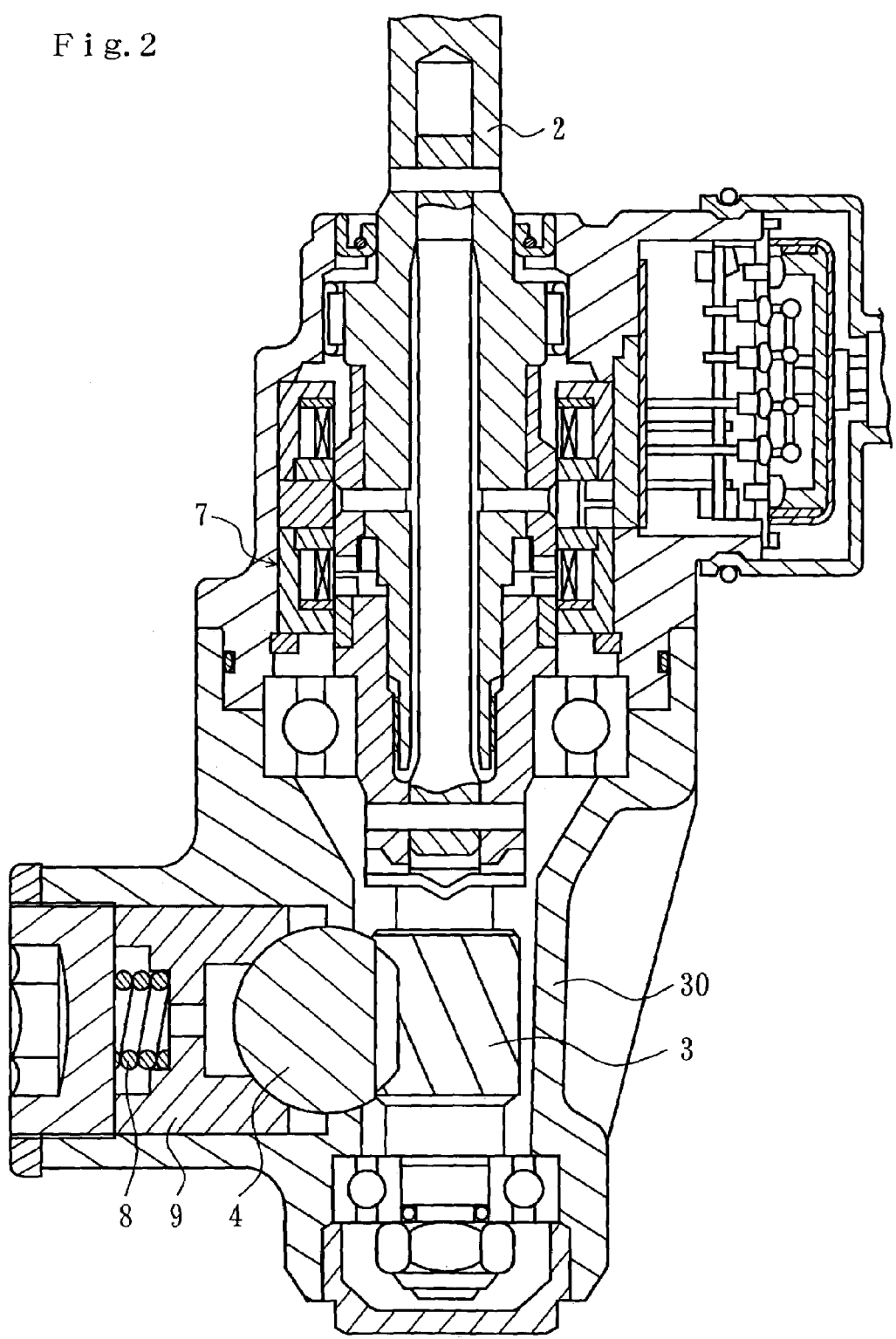
FIG. 2 is a longitudinal cross sectional view of the electric power steering apparatus of the embodiment of the present invention.

A rack-and-pinion type electric power steering apparatus 1 shown in FIG. 1 and FIG. 2 comprises a pinion 3 which rotates by steering operation with a steering wheel H linked to an input shaft 2, and a rack 4 which meshes with the pinion 3, wherein vehicle wheels (not shown) are linked to both ends of the rack 4. The steering angle changes by transmitting the movement of the rack 4 by the rotation of the pinion 3 to the vehicle wheels.

A rack housing 30 which encloses the pinion 3 and the rack 4 is provided. The rack housing 30 is constructed by joining a first housing 31 to a second housing 32 by screws and the like, and is installed on the vehicle body. A torque sensor 7 is provided within the rack housing 30 for detecting the steering torque being transmitted to the pinion 3 by the steering operation with the steering wheel H. The torque sensor 7 can employ a known art. The rack 4 is supported by a rack support member 9 in the position where the rack 4 is meshed with the pinion 3. The rack support member 9 has a known structure in this embodiment, that is, it is inserted in the rack housing 30 so as to be moveable in the radial direction of the rack 4, and is pressed on the rack 4 by a spring 8 so as to support the opposite side of the rack 4 from the teeth of the rack 4 via its surface, which has an arc shape as viewed in the axial direction of the rack 4.

Figure 3:
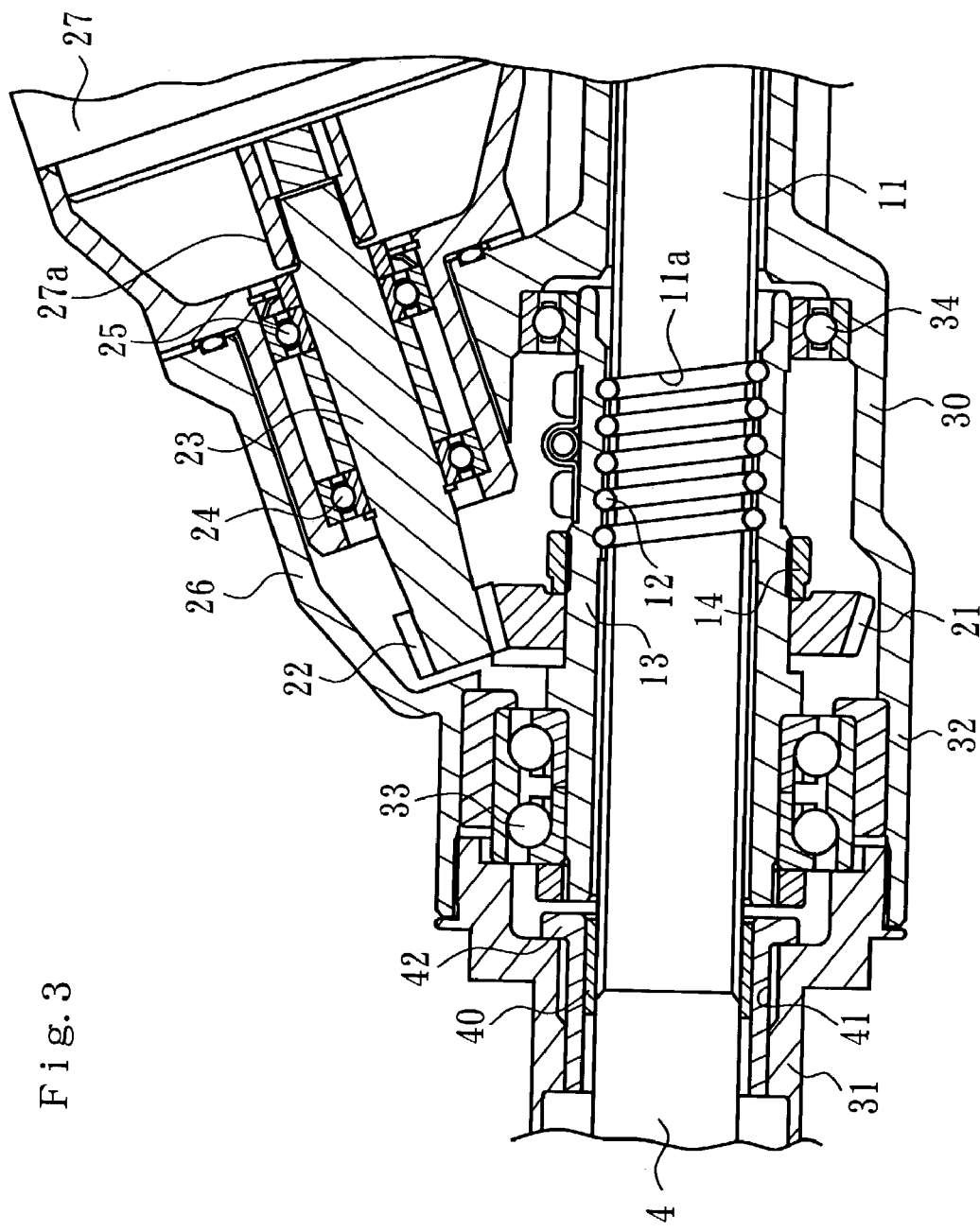
FIG. 3 is a cross sectional view of principal components of the electric power steering apparatus of the embodiment of the present invention.

As shown in FIG. 3, a screw shaft 11 is integrated with the rack 4. In this embodiment, a region closer to one end side (the left side in FIG. 3) from the center in the rack 4 is taken as the screw shaft 11. A ball nut (rotating cylinder) 13 is threadingly engaged with the screw shaft 11 via balls (rolling elements) 12. The ball nut 13 is rotatably supported by the rack housing 30 via double row ball bearings 33 on one end side and a ball bearing 34 on the other end side.

A driven gear 21 is integrated with the ball nut 13 so as to rotate together. In this embodiment, the driven gear 21 is a bevel gear, that is fitted on the outer circumference of the ball nut 13 and integrated therewith by being sandwiched between a step on the outer circumference of the ball nut 13 and a nut 14 threadingly engaged with the ball nut 13.

A drive gear 22 which meshes with the driven gear 21 is integrally provided on a drive shaft 23. The drive gear 22 is rotatably supported by a gear housing 26 via ball bearings 24, 25 which support the drive shaft 23. The gear housing 26 is formed integrally with the second housing 32 of the rack housing 30. An output shaft of a steering assist force generating motor 27 attached to the gear housing 26 is connected to the drive shaft 23 via a coupling 27*a*. As a result, the ball nut 13 is rotationally driven by the motor 27 via the drive gear 22 and the driven gear 21 which are components of a reduction gear mechanism.

An in-vehicle control device (not shown) connected to the above-mentioned torque sensor 7 and the motor 27, drives the motor 27 in accordance with the steering torque detected by the torque sensor 7. As a result, the power output of the motor 27 is transmitted to the ball nut 13 via the drive gear 22 and the driven gear 21, and the rotational force of the ball nut 13 is transmitted to the rack 4 as a steering assist force via the balls 12 and the screw shaft 11. The control method of the motor 27 is not limited specifically, and altering the steering assist force in accordance with a variable other than the steering torque such as the vehicle speed or the like is also acceptable.

In the movement range of the screw shaft 11, a support body capable of supporting the outer circumference of the screw shaft 11 is provided. In this embodiment, the support body is a cylindrical bush 40, and is supported by the rack housing 30 by being fitted into the inner circumference of a cylinder member 42 threadingly engaged into the inner circumference of the first housing 31 via threads 41. The bush 40 is formed by coating the surface of a sheet steel with polytetrafluoroethylene or a copper compound or similar for example, and is provided with a split. The outer circumference of the screw shaft 11 is supported by the inner circumference of the bush 40. In this embodiment, the bush 40 is arranged in the vicinity of the border region of the rack 4 and one end of the screw shaft 11 when the vehicle is travelling straight. Alternatively, the bush 40 can be arranged in a position constantly supporting the screw shaft 11, or arranged in a position supporting the screw shaft 11 only when turning either right or left. All of the above-mentioned balls 12 are arranged between the bush 40 and the rack support member 9. As a result, loads acting on the rack 4 from the road surface via the vehicle wheels are received by the bush 40 and the rack support member 9, and flexure of the screw shaft 11 can be inhibited. The difference between the internal diameter of the bush 40 and the external diameter of the screw shaft 11 is made about 0.05 mm for example.

Figure 4:
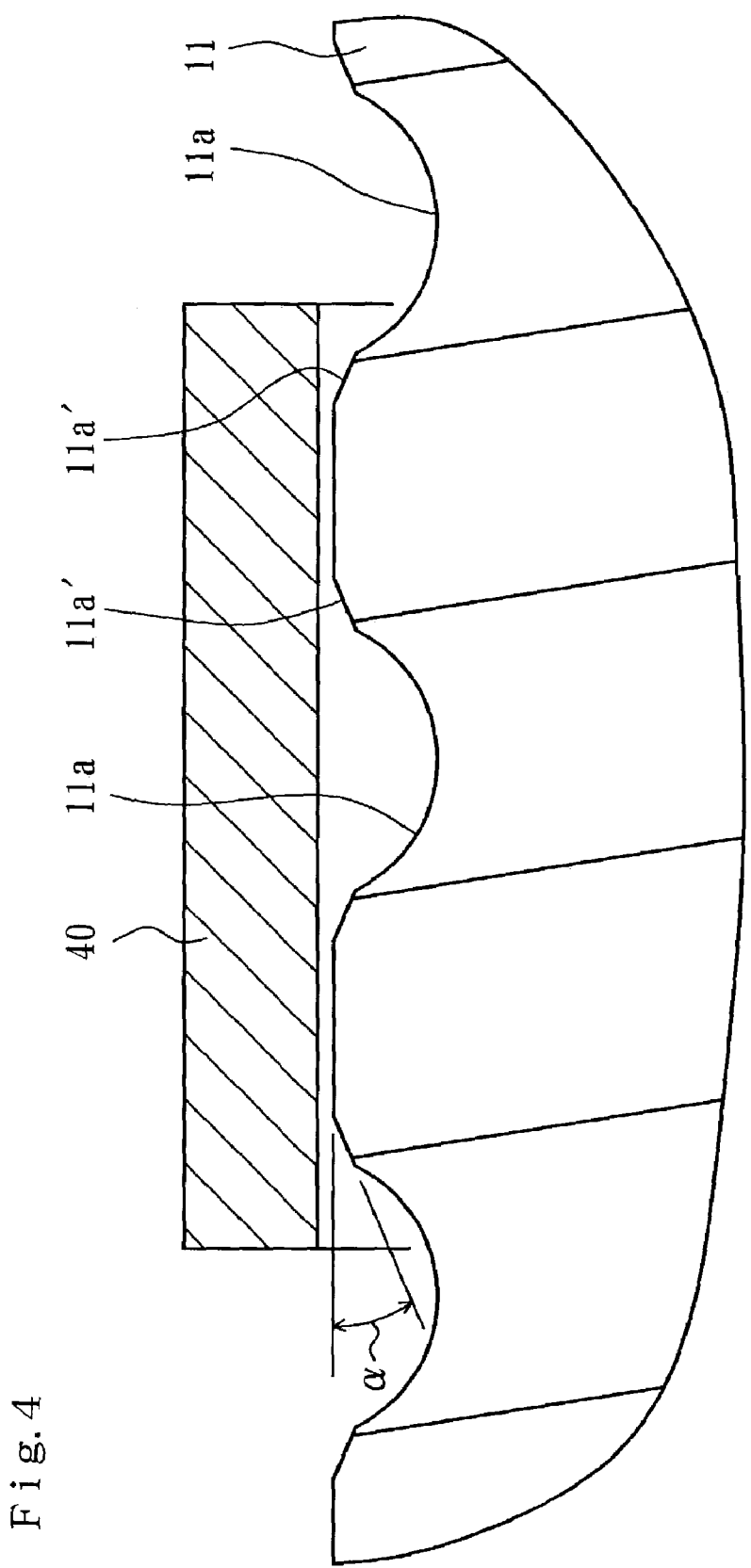
FIG. 4 is an expanded view of a section in the electric power steering apparatus of the embodiment of the present invention.

As shown in FIG. 4, opening edges 11*a*′ of a spiral race 11*a* on the screw shaft 11 are chamfered so that wear of the bush 40 due to contact with the opening edges 11*a*′ of the race 11*a* is inhibited. In this embodiment, each of the chamfered edges 11a' is made a flat surface. It is desirable that the angle α made by each of the chamfered edges 11a' against the axial direction of the screw shaft 11 is 30 degrees or less.

According to the above-mentioned embodiment, loads acting on the rack 4 from the road surface via the vehicle wheels are received by the rack support member 9 and the bush 40 which support the rack 4, so that flexure of the rack 4 between the bush 40 and the rack support member 9 can be prevented. All of the balls 12 are arranged between the bush 40 and the rack support member 9, so that flexure in the screw shaft 11 can be reduced, and increases in friction between the balls 12 and the screw shaft 11 and between the balls 12 and the ball nut 13 can be prevented. Furthermore, the bush 40 is arranged in the movement range of the screw shaft 11 and is capable of supporting the outer circumference of the screw shaft 11, so that the screw shaft 11 can be arranged at the vicinity of the end of the rack 4, further away from the rack support member 9 than all of the balls 12. As a result, the degree of freedom in the layout of the motor 27 in the steering apparatus 1 can be enhanced. By supporting the bush 40 by the rack housing 30, even if the distance between the rack support member 9 and the screw shaft 11 increases, the outer circumference of the screw shaft 11 can be supported by the bush 40 and flexure of the screw shaft 11 can be reduced. Furthermore, the opening edges 11a' of the race 11a on the outer circumference of screw shaft 11 are chamfered, so that wear of the bush 40 due to contacting with the opening edges 11a' can be inhibited.

Figure 5:
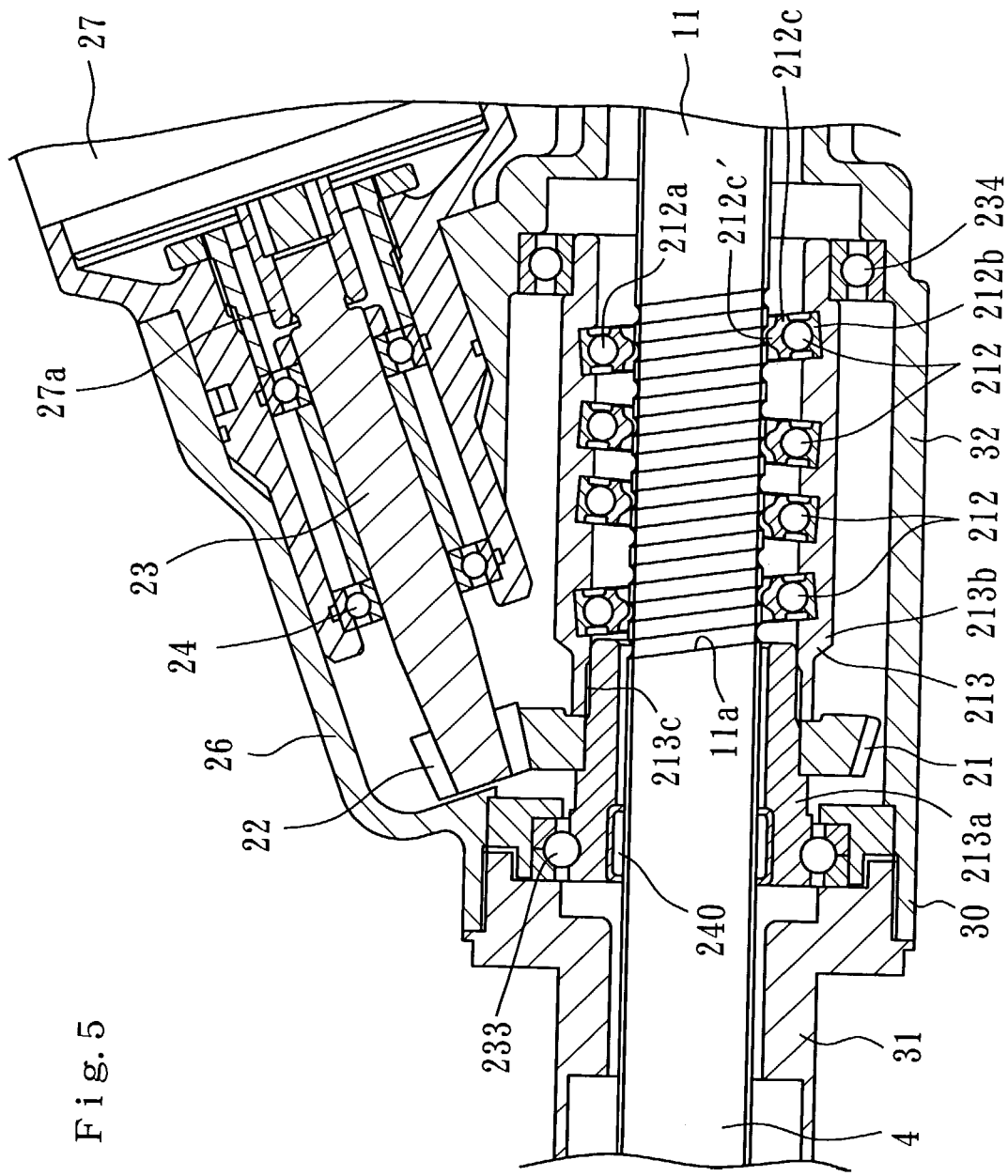
FIG. 5 is a cross sectional view of principal components of a first modification of the electric power steering apparatus of the present invention.

FIG. 5 shows a first modification of the present invention. A difference with the above-mentioned embodiment is firstly that a needle bearing 240 which is a rolling bearing in place of the bush 40 is employed as a support body. Furthermore, in place of the balls 12 and the ball nut 13, a plurality (in this embodiment four) of ball bearings 212 arranged along the axial direction of the screw shaft 11, and a cylinder body 213 covering these ball bearings 212 are employed. The cylinder body 213 is made by connecting a first member 213a to a second member 213b via threads 213c, and is supported rotatably by the rack housing 30 via a ball bearing 233 on one end side and a ball bearing 234 on the other end side. The driven gear 21 is fitted on the outer circumference of the first member 213a of the cylinder body 213, and is integrated with the cylinder body 213 by being sandwiched between the second member 213b and a step on the outer circumference of the first member 213a. The inner ring of the ball bearing 233 on one end side is integrated with the outer circumference of the cylinder body 213. The needle bearing 240 is supported by the cylinder body 213 by being fitted into the inner circumference of the cylinder body 213. Balls 212a of the ball bearings 212 are the rolling elements of the present invention. The cylinder body 213 is threadingly engaged with the screw shaft 11 via these balls 212a. In other words, an outer ring 212b of each of the ball bearings 212 is integrated with the cylinder body 213 so as to rotate together. An annular protruding portion 212c' is formed on the inner circumference of an inner ring 212c of each of the ball bearings 212, so as to be capable of coming into contact with the spiral race 11a on the screw shaft 11. The rotational axes of the ball bearings 212 are inclined in relation to the center axis of the screw shaft 11 by an angle equal to the lead angle of the spiral race 11a, with these directions of incline made mutually reversed between the two ball bearings 212 on the central side and the two ball bearings 212 on the opposite end sides. Furthermore, the rotational axis of each of the ball bearings 212 is eccentric to the center axis of the screw shaft 11. Each of the ball bearings 212 is in contact at one position with the inner surface of the spiral race 11a via the annular protruding portion 212c', and the positions of contact for the two ball bearings 212 on the central side are separated from the positions of contact for the two ball bearings 212 on the opposite end sides in the rotational direction by 180 degrees. As a result, when the cylinder body 213 is rotationally driven by the motor 27, an axial force acts on the screw shaft 11 via the ball bearings 212. This sort of rack feeding mechanism utilizing ball bearings can employ a known art disclosed in Japanese Patent Laid-Open No. 2000-352450 for example. According to the first modification, uneven wear is prevented because the needle bearing 240 rotates relatively to the screw shaft 11, and wear through contact with the opening edges 11a' of the race 11a on the screw shaft 11 is also inhibited, enhancing longevity. Additionally, by using the needle bearing 240 which is a rolling bearing as a support body, the screw shaft 11 and the cylinder body 213 are able to smoothly rotate relatively, and the transmitting efficiency can be improved. The remainder is the same as the above-mentioned embodiment, and corresponding sections are indicated by identical symbols.

Figure 6:
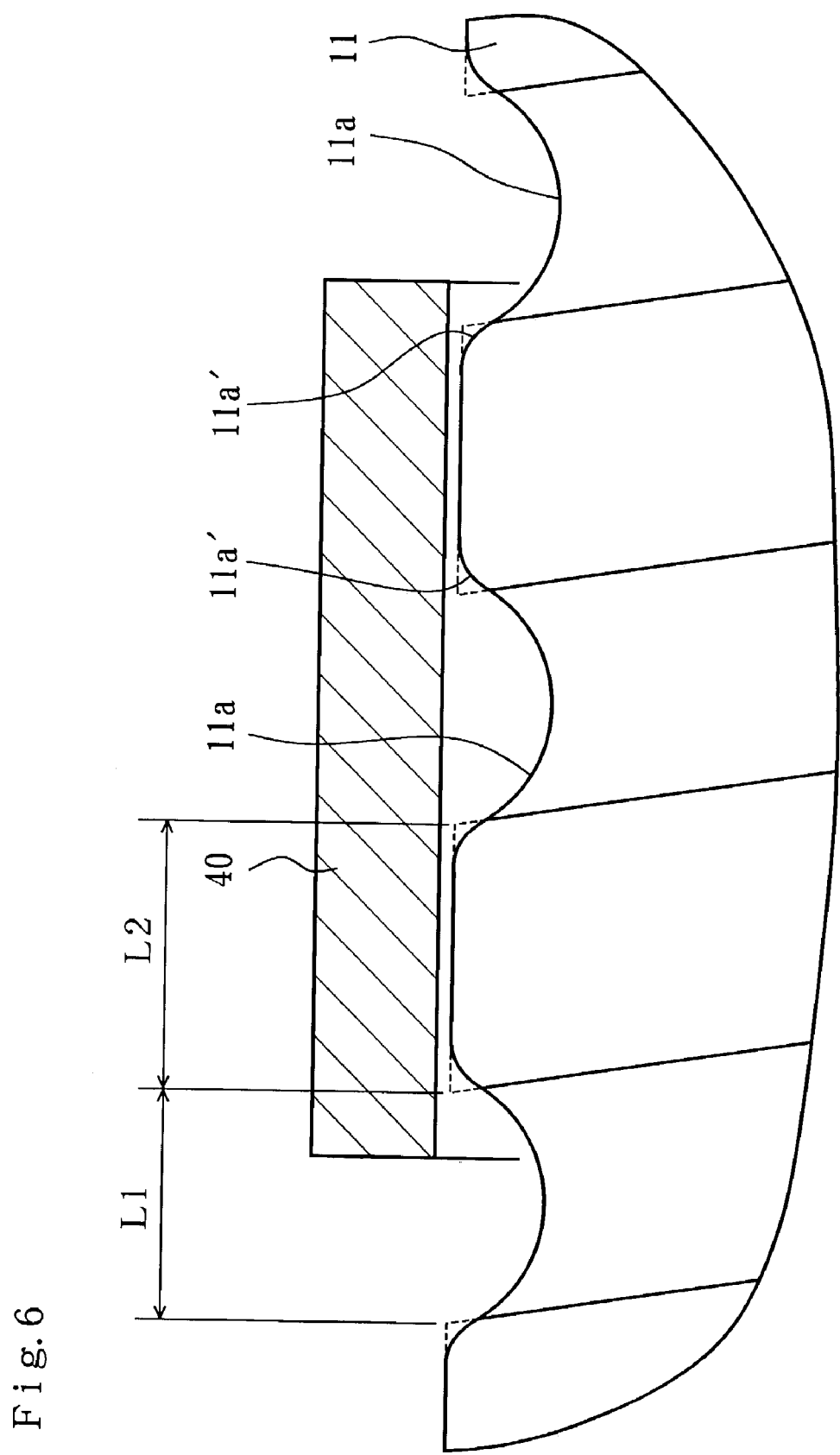
FIG. 6 is an expanded view of a section in a second modification of the electric power steering apparatus of the present invention.
Figure 7:
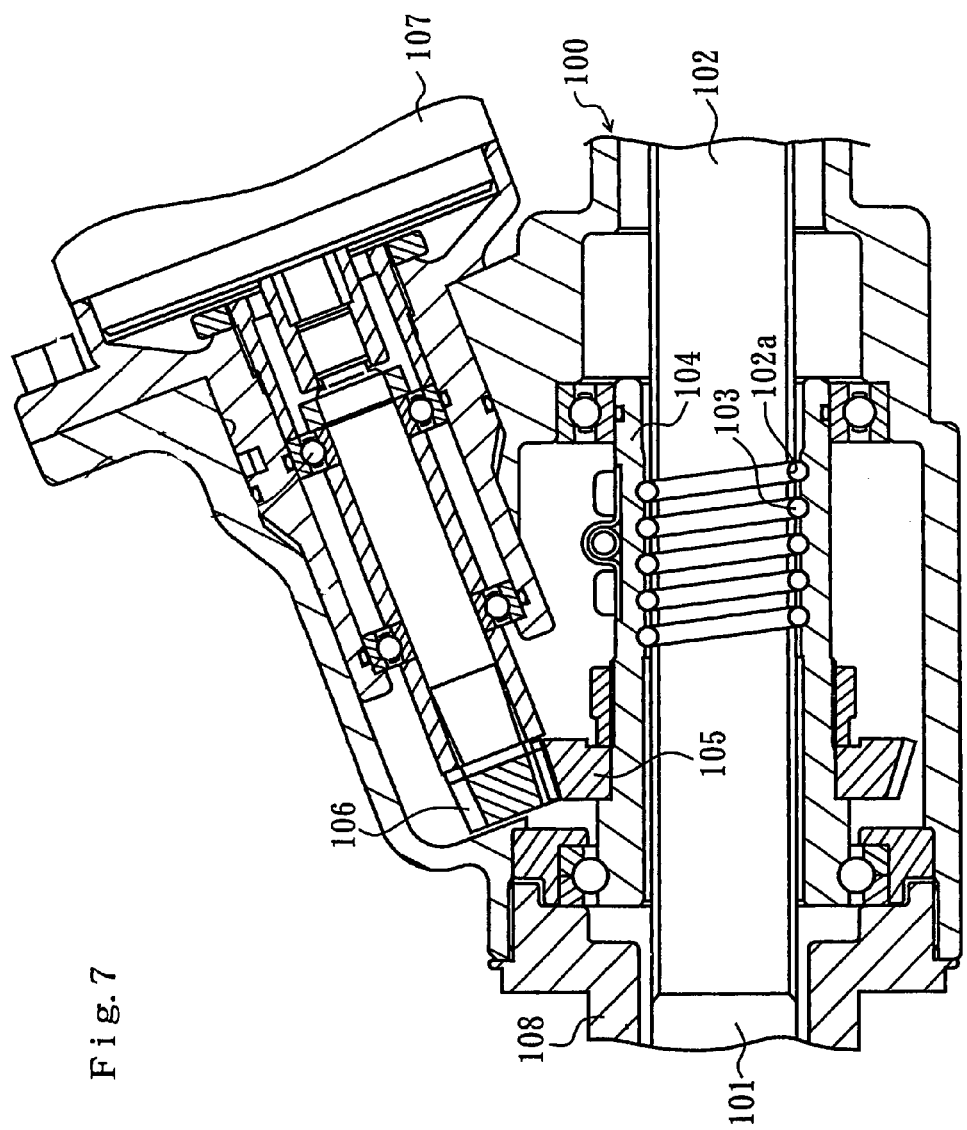
FIG. 7 is a cross sectional view of a section of a conventional electric power steering apparatus.

FIG. 6 shows a second modification of the present invention. Differences to the above-mentioned embodiment and the first modification reside in that each of the chamfered edges 11a' of the opening of the spiral race 11a in the outer circumference of the screw shaft 11 is a convex curve, and a dimension L1 in the screw shaft axial direction of the spiral race 11a is made smaller than a dimension L2 in the screw shaft axial direction of the interval between the sections of the spiral race 11a. In this case where the opening edges 11a' of the spiral race 11a are chamfered, the dimensions L1, L2 are determined as though the chamfer 11a' had not been formed as illustrated by the broken line in the figure. In this manner, pressure acting on the inner circumferential surface of the bush 40 or the needle bearing 240 from the outer circumferential surface of the screw shaft 11 can be reduced, wear of the bush 40 or the needle bearing 240 can be inhibited, and deterioration in transmitting efficiency resulting from play in the screw shaft 11 can be prevented. The remainder is the same as the above-mentioned embodiment, and corresponding sections are indicated by identical symbols.

The present invention is not limited to the above-mentioned embodiments. For example, a rolling bearing can be used in place of the bush 40 in this embodiment, or the bush 40 can be supported by the ball nut 13 in place of the rack housing 30. In the first modification, a bush can be used in place of the needle bearing 240, or the needle bearing 240 can be supported by the rack housing 30. Furthermore, the type of the drive gear 22 and the driven gear 21 is not limited to a bevel gear. Further, a motor having a rotor integrated with a rotating cylinder can be used, so that the rotating cylinder is driven without employing a gear mechanism. Furthermore, a steering apparatus pertaining to the present invention is not limited to a power steering apparatus, for example the present invention can be applied to an automatic steering apparatus which drives a rack only by motor output power in order to drive an unmanned vehicle along guidance markers on the road surface, or can be applied to a steering apparatus employing a steer-by-wire system which drives a rack only by motor output power driven according to the steering operation with a steering wheel which is not connected mechanically to the vehicle wheels.

What is claimed is:

1. A vehicle steering apparatus, comprising:
a pinion, which rotates by steering operation;

a rack, which meshes with said pinion;

a screw shaft, integrated with said rack;

a rotating cylinder, threadingly engaged with said screw shaft via rolling elements;

a motor, which drives said rotating cylinder;

a rack housing, which rotatably supports said rotating cylinder;

a rack support member, which supports said rack in a position where said rack is meshed with said pinion, said rack changing, a steering angle by transmitting movement of said rack to vehicle wheels; and a support body, capable of supporting an outer circumference of said screw shaft, and arranged in a movement range of said screw shaft;

wherein all of said rolling elements are arranged between said support body and said rack support member, and loads acting on said rack from a road surface are received by said support body and said rack support member; and wherein said support body is supported by said rotating cylinder.

2. The vehicle steering apparatus according to claim 1, wherein a rolling bearing is employed as said support body.

3. The vehicle steering apparatus according to claim 1, wherein said support body is supported by said rack housing.

4. The vehicle steering apparatus according to claim 1, wherein a dimension in the screw shaft axial direction of a spiral race on the outer circumference of said screw shaft is made smaller than a dimension in the screw shaft axial direction of an interval between sections of said spiral race.

5. A vehicle steering apparatus, comprising:

a pinion, which rotates by steering operation;

a rack, which meshes with said pinion;

a screw shaft, integrated with said rack;

a rotating cylinder, threadingly engaged with said screw shaft via rolling elements;

a motor, which drives said rotating cylinder;

a rack housing, which rotatably supports said rotating cylinder;

a rack support member, which supports said rack in a position where said rack is meshed with said pinion, said rack changing, a steering angle by transmitting movement of said rack to vehicle wheels; and a support body, capable of supporting an outer circumference of said screw shaft, and arranged in a movement range of said screw shaft;

wherein all of said rolling elements are arranged between said support body and said rack support member, and loads acting on said rack from a road surface are received by said support body and said rack support member; and wherein opening edges of a spiral race on the outer circumference of said screw shaft are chamfered.

6. The vehicle steering apparatus according to claim 5, wherein a dimension in the screw shaft axial direction of the spiral race on the outer circumference of said screw shaft is made smaller than a dimension in the screw shaft axial direction of an interval between sections of said spiral race.

7. The vehicle steering apparatus according to claim 5, wherein said support body is supported by said rack housing.

* * * * *